United States Patent [19]
Hilburger et al.

[11] Patent Number: 4,955,449
[45] Date of Patent: Sep. 11, 1990

[54] WHEEL SLIP CONTROL SYSTEM FOR MOTOR VEHICLES

[75] Inventors: Walter Hilburger, Nürtingen; Siegfried Ochs, Remshalden, both of Fed. Rep. of Germany

[73] Assignee: Diamler-Benz AG, Stuttgart, Fed. Rep. of Germany

[21] Appl. No.: 403,314

[22] Filed: Sep. 6, 1989

[30] Foreign Application Priority Data

Sep. 13, 1988 [DE] Fed. Rep. of Germany ....... 3831105

[51] Int. Cl.$^5$ .......................................... B60K 31/00
[52] U.S. Cl. ............................... 180/197; 364/426.01; 364/426.03
[58] Field of Search ................ 180/197; 364/426.01, 364/426.03

[56] References Cited

U.S. PATENT DOCUMENTS

| 3,802,529 | 4/1974 | Burckhardt et al. | 180/197 |
| 4,410,947 | 10/1983 | Strong et al. | 180/197 |
| 4,484,653 | 11/1984 | Horikoshi et al. | 180/197 |
| 4,765,430 | 8/1988 | Schulze et al. | 180/197 |
| 4,766,972 | 8/1988 | Takata et al. | 180/197 |
| 4,852,008 | 7/1989 | Sager | 364/426.01 |

FOREIGN PATENT DOCUMENTS 3544294 6/1987 Fed. Rep. of Germany.
3644136 9/1988 Fed. Rep. of Germany.

Primary Examiner—Mitchell J. Hill
Assistant Examiner—A. M. Boehler
Attorney, Agent, or Firm—Evenson, Wands, Edwards, Lenahan & McKeown

[57] ABSTRACT

A wheel slip control system for motor vehicles is provided wherein when a given driven vehicle wheel spins this vehicle wheel is braked, and wherein when both driven wheels spin, the engine power is reduced. A spinning of the driving wheels is obtained by means of rotational speed sensors and a signal is fed to an electronic control unit. When a slip signal is present as a result of the exceeding of a differential speed threshold value between the driven and the non-driven vehicle axle, the engine power is controlled downward by the electronic control unit during the duration of the spin signal by means of a control element. When the slip signal drops, the engine power is again controlled upward to the desired gas pedal value set by the driver. In order to avoid drive train vibrations, the electronic control unit generates an output signal which actuates a time function element to prolong the activating of the downward-controlling control element beyond the duration of the last spin signal when spin signals occur at intervals within a certain limit time.

6 Claims, 1 Drawing Sheet

WHEEL SLIP CONTROL SYSTEM FOR MOTOR VEHICLES

BACKGROUND OF THE INVENTION

The invention relates to a wheel slip control system (ASR) for motor vehicles wherein, when a driven vehicle wheel spins it is braked, and when both driven wheels spin, the engine power is also reduced. A spinning of the driving wheels is sensed by rotational speed sensors and fed to an electronic control unit which creates a slip signal when a differential speed threshold value between the driven and the non-driven vehicle axle is exceeded. The electronic control unit controls engine power downward during the duration of the slip signal through a control element. When the spin signal drops out, the engine power is controlled upward to the desired gas pedal value set by the driver. The period for control is set by a time function element in the electronic control unit.

A wheel slip control system of this general type is known (DE-OS 35 44 294) wherein the engine power at the start and at the end of the wheel slip control operation is controlled such that, during the downward control as well as during the upward control, the power follows first a steep and then a flat rise. In this case, a time function element is provided which can be controlled by an electronic control unit and contributes to achieving the desired steep-curve characteristics.

Wheel slip control systems have the purpose of preventing an uncontrolled spinning of the driving wheels when a vehicle is started on a smooth ground surface. When spinning occurs, the starting time of the vehicle is prolonged unnecessarily, its tractive power is reduced and cornering force is diminished.

The spinning of the wheels is sensed by rotational speed sensors arranged at the wheels and is analyzed in an electronic control unit. If only one wheel spins, the pertaining wheel brake is actuated by means of a valve control of a brake. As a result, by means of the wheel differential, a drive torque is transmitted to the other drive wheel.

When both driving wheels spin, however, the power of the driving engine is controlled downward. For this purpose, intervention with the throttle linkage causes the value set by the driver to be reduced.

The wheel slip engine control system therefore normally becomes operative when a certain speed difference exists between the driven and the non-driven axle. When one falls below this speed difference threshold, the engine control switches off again with the power of the engine controlled upward to the value set by the driver by means of the gas pedal.

When the vehicle is loaded and the tractive-force level is high (e.g. rough ice, snow), a brief spinning of the driving wheels frequently occurs and triggers the wheel slip engine control. As soon as the power is reduced a little, adhesion with respect to the road surface is reestablished and the engine power is increased again, which may result in a renewed spinning of the driving wheels. In the worst case, when the cycle is continually repeated, strong drive train vibrations may occur which require special interventions by the driver.

It is the object of the invention to develop a wheel slip control system of the above-mentioned type in such a manner that drive train vibrations can no longer occur.

According to the invention, this object is achieved if an output signal is generated when spin signals occur at intervals below a certain limit time. This actuates the time function element to prolong the actuation of the downward-controlling control element beyond the duration of the last spin signal.

It is advantageous if the electronic control unit again generates an output signal, when a given time period has not been passed between another spin signal and the dropping of the preceding spin signal.

It is also advantageous if the time function element automatically switches to a longer deceleration time period after the expiration of the first deceleration time period, but automatically switches back to the first declaration time period if it is not activated again by the output spin signal within a given time. The time function element, after the expiration of the longer deceleration time period, automatically switches over to a still longer deceleration time period; after the expiration of that still longer deceleration time period, to an even longer deceleration time period, then the still long longer time period, etc. However, the time function element will automatically switch back to the first extension time period if, within a given time period, it is not again activated by an output spin signal.

Other objects, advantages and novel features of the present invention will become apparent from the following detailed description of the invention when considered in conjunction with the accompanying drawings.

DETAILED DESCRIPTION OF THE DRAWINGS

Figure 1:
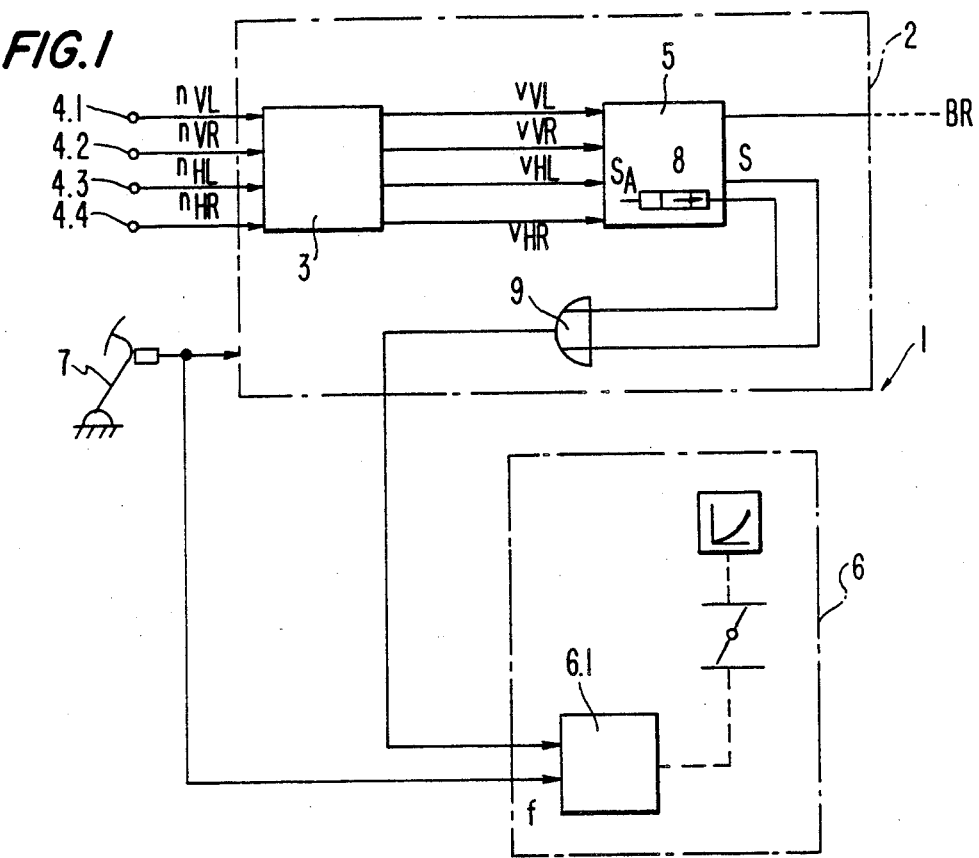
FIG. 1 is a schematic block diagram of the wheel slip control system.

According to FIG. 1, rotational speed signals $n_{vL}$ and $n_{vR}$ of the non-driven wheels and $n_{HL}$ and $n_{HR}$ of the driven wheels are sensed by rotational speed sensors 4.1 to 4.4 and are supplied to a signal processing level 3 of the electronic control unit 2 of the wheel slip control system 1. The electronic control unit converts these into speed signals $v_{vL}$, $v_{vR}$, $v_{HL}$ and $v_{HR}$ which, in turn, are supplied to a comparator circuit 5. This comparator circuit 5 determines whether both driving wheels have slip.

Figure 2:
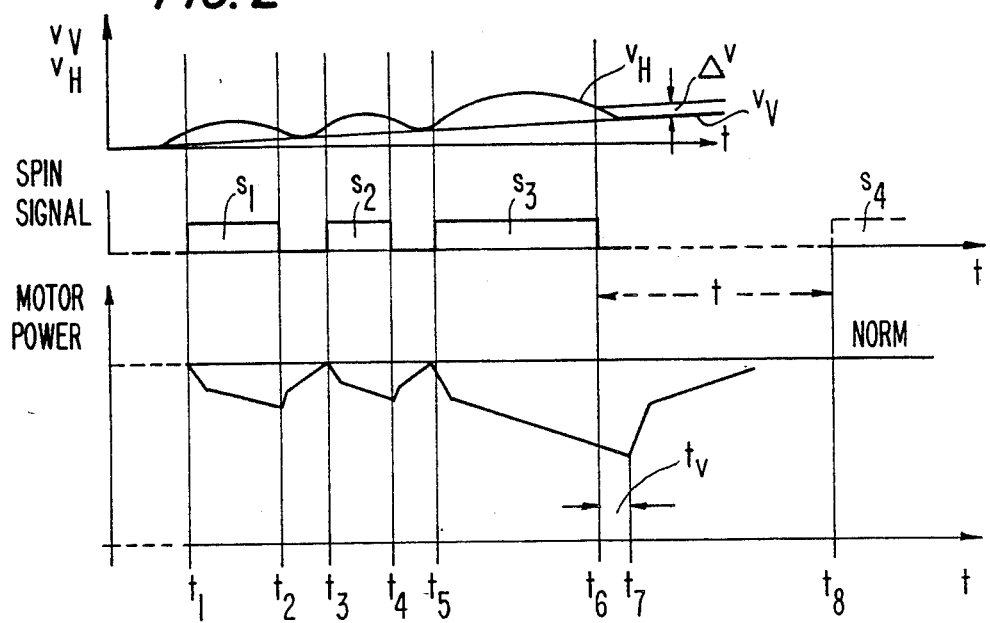
FIG. 2 are diagrams of characteristic curves.

The comparator circuits also determines average speeds $v_v$ for the non-driven wheels and $v_H$ for the driven axle in which case $v_v$ may be equalled to the driving speed. The circuit also compares the average speeds $v_v$ and $v_H$ with one another. When $v_H$, with respect to $v_v$, exceeds a given threshold value $\Delta v$ (for example 1.8 km/h). A spin signal s is generated, which is supplied to a control element 6.1 of a throttle control 6. This signal s has priority over the desired-value signal f of the gas pedal 7, so that a direct influencing of the engine by way of the throttle valve by the driver is prevented. Signal s has the effect that the engine power is controlled downward during the duration that the signals appear. The duration of signals depends on when, as a result of the power reduction, $v_H$ with respect to $v_v$ will again fall below the given threshold value $\Delta v$. In the case of a falling-below this threshold value, signal s and the engine power are controlled upward again to the desired gas pedal value set by the driver. This process may be repeated several times, as shown in FIG. 2. However, if several slip signals ... $s_1$, $s_2$, $s_3$, occur consecutively at short time intervals ..., $(t_3-t_2)$, $(t_5-t_4)$ and if one of these time intervals is shorter than a predetermined limit time (for example, $t_5-t_4 \leq 100$ ms) the comparator circuit 5 generates an output signal $s_A$ which affects a monostable time function element 8 and activates it by means of the drop of the last slip signal $s_3$ for a given time $t_v$ ($=t_7-t_6$).

The output signal from the monostable element 8 acts upon the control element 6.1 by means of an OR-element 9 (which also carries signal) to thereby prolong the duration of control. The time $t_v$ is selected in such a manner (for example, $>10$ ms) that, as a result of the extension of the control, the engine power may be reduced to such an extent that a sufficient interval exists with respect to the threshold value $\Delta$ v (slip limit) and, as a result, drive train vibrations can no longer occur.

However, as a result of a very strong wheel slip, after the previous wheel slip control operation, another slip signal $s_4$ may be generated within a give time $t = t_8 - t_7$) (for example $<860$ ms). Here an output signal $s_{A1}$ is again generated by the comparator circuit 5 and supplied to the time function element 8 so that, by means of the drop of the additional slip signal $s_4$, the time element 8 is activated for a given time $t_v$ and this thus prolongs the control duration of the control element.

However, the time function element 8 may also be constructed in such a manner that after the expiration of the deceleration time $t_v$, it switches automatically to a longer deceleration time $t_{v1}$ so that, when the slip signal $s_4$ is generated within the time $t$ and thus the output signal $s_{A1}$ is generated by the comparator circuit, the time function element is activated with the drop of the slip signal $s_4$ for the longer deceleration time $t_{v1}$. In the case of additional following slip signals, within a specified time t, the deceleration time $t_{v1}$ is prolonged further ($t_{v2}$, $t_{v3}$, ...), but when a further slip signal $s_4$ does not occur (therefore, no slip signal or no triggering of the time function element by means of an output signal $s_{A1}$ within the time t (e.g. $<860$ ms), the time function element 8 automatically switches back to the short time prolongation $t_v$.

As also shown in FIG. 1, when a one-sided slip of a driving wheel is recognized, the comparator circuit 5 also generates a signal for the control of the wheel brake BR.

Although an influencing of the engine power is described by an intervention in the throttle valve control, naturally an intervention may also take place in the ignition or the fuel supply or fuel quantity.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A wheel slip control system for motor vehicles having:
    an engine, a driver operated gas pedal, driven and non-driven wheels and axles, and a control means for braking a driven vehicle wheel when it spins; wherein when both driven wheels spin, the control means additionally reduces engine power; wherein
    a spinning of the driven wheels is sensed by rotational speed sensors feeding an electronic control unit which creates a slip signal at a time when a differential speed threshold value between the driven and the non-driven vehicle axle is exceeded; wherein
    engine power is a control element means of the electronic control unit during the time that the slip signal is created;
    wherein when the slip signal drops out, the electronic control unit permits engine power to be controlled upward to a desired gas pedal value set by the driver; wherein
    a time function element means is provided which can be activated by the electronic control unit; and wherein
    the electronic control unit generates an output signal when slip signals occur at repeated intervals within a certain limit time to cause the time function element means to prolong the activating of the downward-controlling control element means beyond a duration of time of the last slip signal.

2. A wheel slip control system according to claim 1, wherein the electronic control unit again generates an output signal when a given time has not been reached between another slip signal and the drop of the preceding slip signal.

3. A wheel slip control system according to claim 1, wherein the time function element means automatically switches to a longer deceleration time period after the expiration of a first deceleration time period, but automatically switches back to the first deceleration time period if the electronic control unit does not activate the time function element means with another output slip signal within a given time.

4. A wheel slip control system according to claim 2, wherein the time function element means automatically switches to a longer deceleration time period after the expiration of a first deceleration time period, but automatically switches back to the first deceleration time period if the electronic control unit does not activate the time function element means with another output slip signal within a given time.

5. A wheel slip control system according to claim 3, wherein the time function element means automatically switches over to a still longer deceleration time period after the expiration of the longer deceleration time period, and subsequently thereafter to still longer deceleration time periods if reactivated by a slip signal; and automatically switches back to the first declarative time period if, within a given time, it is not again activated by a slip signal.

6. A wheel slip control system according to claim 4, wherein the time function element means automatically switches over to a still longer deceleration time period after the expiration of the longer deceleration time period, and subsequently thereafter to still longer deceleration time periods if reactivated by a slip signal; and automatically switches back to the first deceleration time period if, within a given time, it is not again activated by a slip signal.

* * * * *